United States Patent
Zhou et al.

(10) Patent No.: US 12,293,557 B2
(45) Date of Patent: May 6, 2025

(54) IMAGE PROCESSING METHOD AND DEVICE, EQUIPMENT, AND COMPUTER-READABLE STORAGE MEDIUM

(71) Applicant: GUANGDONG OPPO MOBILE TELECOMMUNICATIONS CORP., LTD., Guangdong (CN)

(72) Inventors: Yang Zhou, Palo Alto, CA (US); Jie Liu, Palo Alto, CA (US)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 504 days.

(21) Appl. No.: 17/742,780

(22) Filed: May 12, 2022

(65) Prior Publication Data

US 2022/0270397 A1    Aug. 25, 2022

Related U.S. Application Data

(63) Continuation of application No. PCT/CN2020/130206, filed on Nov. 19, 2020.
(Continued)

(51) Int. Cl.
*G06V 10/25* (2022.01)
*G06N 3/08* (2023.01)
(Continued)

(52) U.S. Cl.
CPC .............. *G06V 10/25* (2022.01); *G06N 3/08* (2013.01); *G06V 10/762* (2022.01);
(Continued)

(58) Field of Classification Search
None
See application file for complete search history.

(56) References Cited

U.S. PATENT DOCUMENTS 8,559,707 B2 * 10/2013 Wu ........................ G06V 10/25
382/165
2017/0124478 A1    5/2017 Baradaran et al.
(Continued)

FOREIGN PATENT DOCUMENTS

| CN | 107665498 | 2/2018 |
| CN | 109325454 | 2/2019 |

(Continued)

OTHER PUBLICATIONS

WIPO, International Search Report and Written Opinion for PCT/CN2020/130206, Feb. 20, 2021.

*Primary Examiner* — Leon Flores
(74) *Attorney, Agent, or Firm* — Hodgson Russ LLP

(57) ABSTRACT

An image processing method and device, an equipment, and a computer-readable storage medium are provided. The method includes the following. An image is obtained. Object detection is performed on the image with an object detection network to obtain an object detection result. The object detection network is a network obtained by performing object detection on sample images in a sample image set based on at least one cluster center value with an initial object detection network and training iteratively the initial object detection network based on results of the object detection. The at least one cluster center value is obtained by clustering labeled regions in a labeled region set corresponding to the sample image set based on preset attribute information. The image is processed based on the object detection result.

20 Claims, 14 Drawing Sheets

Related U.S. Application Data

(60) Provisional application No. 62/938,233, filed on Nov. 20, 2019.

(51) Int. Cl.
  *G06V 10/762* (2022.01)
  *G06V 10/774* (2022.01)
  *G06V 10/82* (2022.01)
  *G06V 40/16* (2022.01)
  *G06V 40/40* (2022.01)

(52) U.S. Cl.
  CPC ............ *G06V 10/774* (2022.01); *G06V 10/82* (2022.01); *G06V 40/161* (2022.01); *G06V 40/165* (2022.01); *G06V 40/45* (2022.01)

(56) References Cited

U.S. PATENT DOCUMENTS

| | | | | |
|---|---|---|---|---|
| 2018/0060649 | A1* | 3/2018 | Kastaniotis | ........... G06F 18/214 |
| 2022/0327813 | A1* | 10/2022 | Shibata | .............. G06V 10/7753 |

FOREIGN PATENT DOCUMENTS

| | | |
|---|---|---|
| CN | 109492596 | 3/2019 |
| CN | 109859190 | 6/2019 |
| CN | 110097003 | 8/2019 |
| CN | 110765951 | 2/2020 |
| CN | 111008656 | 4/2020 |

* cited by examiner

IMAGE PROCESSING METHOD AND DEVICE, EQUIPMENT, AND COMPUTER-READABLE STORAGE MEDIUM

CROSS-REFERENCE TO RELATED APPLICATION(S)

This application is a continuation of International Application No. PCT/CN2020/130206, filed Nov. 19, 2020, which claims priority to U.S. Provisional Application No. 62/938,233, filed Nov. 20, 2019, the entire disclosures of which are incorporated herein by reference.

TECHNICAL FIELD

This disclosure relates to an image processing technology in the field of artificial intelligence, and particularly to an image processing method and device, an equipment, and a computer-readable storage medium.

BACKGROUND

Face detection has been one of important topics in computer vision research, which plays an important role in daily applications such as face unlocking and video surveillance. In face detection, an object detector is generally used to recognize and locate a face(s) in an image. In order to improve a detection accuracy of the object detector, during training of the object detector, multiple preset prior boxes are generated according to a preset fixed area and a preset aspect ratio in each round of training, and then a preset prior box(es) which has a relatively high overlap degree with a labeled bounding box in a sample image is determined to obtain at least one positive sample, so that the object detector can learn a location mapping between the at least one positive sample and the labeled bounding box, and finally, the trained object detector can determine from the at least one positive sample a predicted bounding box that is closest to the labeled bounding box. However, in the above training method, parameters such as the area and the aspect ratio of the preset prior box are set manually in advance, and these parameters cannot be adjusted flexibly according to different labeled bounding boxes corresponding to a sample image set. As a result, there is still a big difference between the labeled bounding box and the predicted bounding box obtained through regression according to the preset prior box, which leads to insufficient positive samples generated during the training, and accordingly, the object detector cannot fully learn based on the positive samples, thereby reducing an accuracy of object detection.

SUMMARY

The implementations of the disclosure provide an image processing method. The image processing method includes the following. An image is obtained. Object detection is performed on the image with an object detection network to obtain an object detection result. The object detection network is a network obtained by performing object detection on sample images in a sample image set based on at least one cluster center value with an initial object detection network and training iteratively the initial object detection network based on results of the object detection. The at least one cluster center value is obtained by clustering labeled regions in a labeled region set corresponding to the sample image set based on preset attribute information. The image is processed based on the object detection result.

The implementations of the disclosure provide an electronic equipment. The electronic equipment includes a memory and a processor. The memory is coupled to the processor and stores executable instructions which are operable with the processor to implement the image processing method of the implementations of the disclosure.

The implementations of the disclosure provide a non-transitory computer-readable storage medium. The non-transitory computer-readable storage medium stores executable instructions which, when executed by a processor, are operable to implement the image processing method of the implementations of the disclosure.

DETAILED DESCRIPTION

Figure 1:
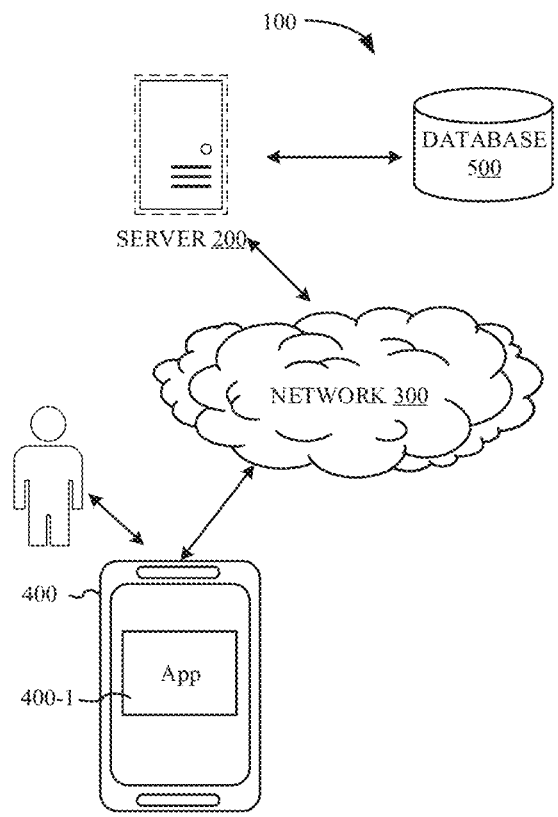
FIG. 1 is an optional schematic structural diagram illustrating an architecture of an image processing system provided in implementations of the disclosure.

In order to make objects, technical solutions, and advantages of the disclosure clearer, the disclosure will be described in further detail below with reference to accompanying drawings. Implementations described below should not be construed as limiting the disclosure. All other implementations obtained by those skilled in the art without creative efforts shall fall within the protection scope of the disclosure.

In the following description, the term "some implementations" involved describes a subset of all possible implementations. It is to be understood, however, that "some implementations" may be the same subset or different subsets of the all possible implementations, and may be combined with each other without conflict.

Unless otherwise defined, all technical and scientific terms herein have the same meaning as commonly understood by one of ordinary skill in the technical field to which the disclosure belongs. The terms herein are merely for the purpose of describing implementations of the disclosure, which are not intended to limit the disclosure.

Before describing implementations of the disclosure in detail, words and terms involved in the implementations of the disclosure are described. These words and terms are suitable for the following explanations.

1) Object detection: image classification, object detection, and image segmentation are three major tasks in the field of computer vision. Image classification concerns the whole image, while object detection concerns a specific object target and is required to obtain both category information and location information of the object. In object detection, the foreground and background of a picture are recognized and analyzed, an object of interest is separated from the background as a target object, and information of the target object such as a confidence, a location, and a size is outputted as boundary information of the target object, where the location and the size are usually represented by coordinates of a rectangular bounding box.

2) Fast single shot multiBox detector (SSD): SSD is a neural network model-based object detector, which can be applied for multiple target object categories. A key feature of an SSD model is the use of multi-scale convolutional bounding box outputs attached to multiple feature maps at the top of the network. This network representation can effectively simulate different bounding box aspect ratios.

3) You only look once (YOLO): YOLO is a deep neural network-based object recognition and localization algorithm, which can locate a target object in an image and determine a location of the target object with one convolutional neural network operation. YOLO is characterized by fast running speed and can be applied to a real-time system.

Face image detection, also referred to as face detection, refers to a process of determining existence of a face image in an input image and determining a specific location of each face image region. At present, face image detection generally adopts convolutional network-based object detection, which mainly consists of two components: a frontend feature extractor and a backend detector. The frontend feature extractor is configured to extract an image feature from an image to-be-processed, and the backend detector is configured to predict an image corresponding to a detection object from the image to-be-processed based on the image feature extracted by the frontend feature extractor, and generate a bounding box around a region where the image corresponding to the detection object is located, to calibrate the detection object.

Implementations of the disclosure provide an image processing method and device, an equipment, and a computer-readable storage medium, which can improve an accuracy of object detection. Exemplary applications of an electronic equipment of implementations of the disclosure will be described below. The electronic equipment may be implemented as various types of user terminals such as laptops, tablets, desktops, set-top boxes, mobile devices (e.g., mobile phones, portable music players, personal digital assistants, dedicated messaging devices, portable gaming devices), and may also be implemented as a server. In the following, exemplary applications of the electronic equipment implemented as a terminal will be described.

Referring to FIG. 1, FIG. 1 is an optional schematic architecture diagram illustrating an image processing system 100 provided in implementations of the disclosure. In order to support an image processing application, a terminal 400 may be coupled with a server 200 through a network 300. The network 300 may be a wide area network, a local area network, or a combination of the two networks.

Figure 2:
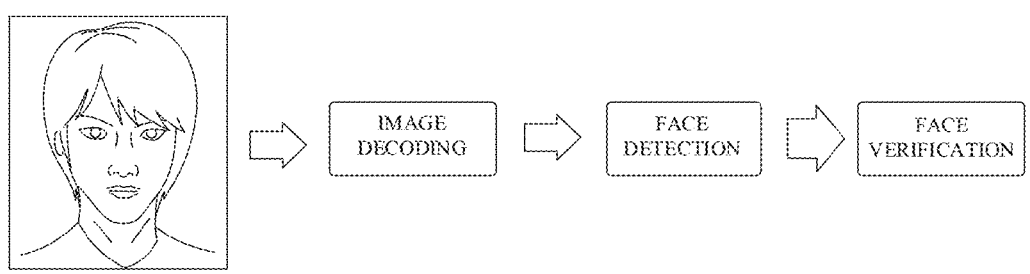
FIG. 2 is an optional schematic flowchart illustrating a face unlocking process provided in implementations of the disclosure.

In some implementations, in a face unlocking scenario, the terminal 400 is configured to collect a face image of a target person with an image collection device, and as illustrated in FIG. 2, perform image decoding, face detection, and face verification on the face image, and then determine whether to perform face unlocking according to a verification result of the face verification. Specifically, during face detection and face verification illustrated in FIG. 2, the terminal 400 is configured to: obtain an image to-be-processed; perform object detection on the image to-be-processed with an object detection network to obtain an object detection result, where the object detection network is a network model obtained by performing object detection based on at least one cluster center value with an initial object detection network in each round of training and performing model training based on an object detection result of each round of training, and the at least one cluster center value is obtained by clustering a labeled region(s) of each sample image in a sample image set based on preset attribute information; perform image processing based on the object detection result, for example, performing face verification to determine whether to perform face unlocking according to a verification result of the face verification; finally, display a face unlocking result on a graphical interface 400-1. The server 200 is configured to obtain a pre-stored standard face image from a database 500, and provide the standard face image to the terminal through the network 300 when the terminal 400 performs face verification, so that the terminal can complete image processing such as face verification and face unlocking.

As an example, the object detection network is a face detection model. The terminal 400 may first prompt on the graphical interface 400-1 that face unlocking is required. The terminal 400 may obtain an image to-be-processed with the image collection device, and perform face detection on the image to-be-processed with the face detection model to obtain a target face image as an object detection result. The face detection model is a network model which is obtained by performing face detection based on at least one cluster center value with an initial face detection model in each round of training and performing model training based on a target face image of each round of training. The at least one cluster center value is obtained by clustering a labeled region(s) of each sample image in a sample image set based on a face category. The terminal 400 may obtain a pre-stored standard face image from the database 500 via the server 200, and perform face verification on the target face image according to the standard face image. If the verification is passed, face unlocking is determined to be successful. If the verification fails, face unlocking is determined to be failed, and a failure message is prompted on the graphical interface 400-1 of the terminal 400.

In some implementations, the server 200 may be an independent physical server, or a server cluster or a distributed system composed of multiple physical servers, or may also be a cloud server that provides basic cloud computing services such as cloud services, cloud databases, cloud computing, cloud functions, cloud storage, network services, cloud communications, middleware services, domain name services, security services, CDN, and big data and artificial intelligence platforms. The terminal 400 may be a smart phone, a tablet computer, a notebook computer, a desktop computer, a smart speaker, a smart watch, etc., which is not limited herein. The terminal may be directly or indirectly coupled with the server through wired or wireless communication, which is not limited in implementations of the disclosure.

Figure 3:
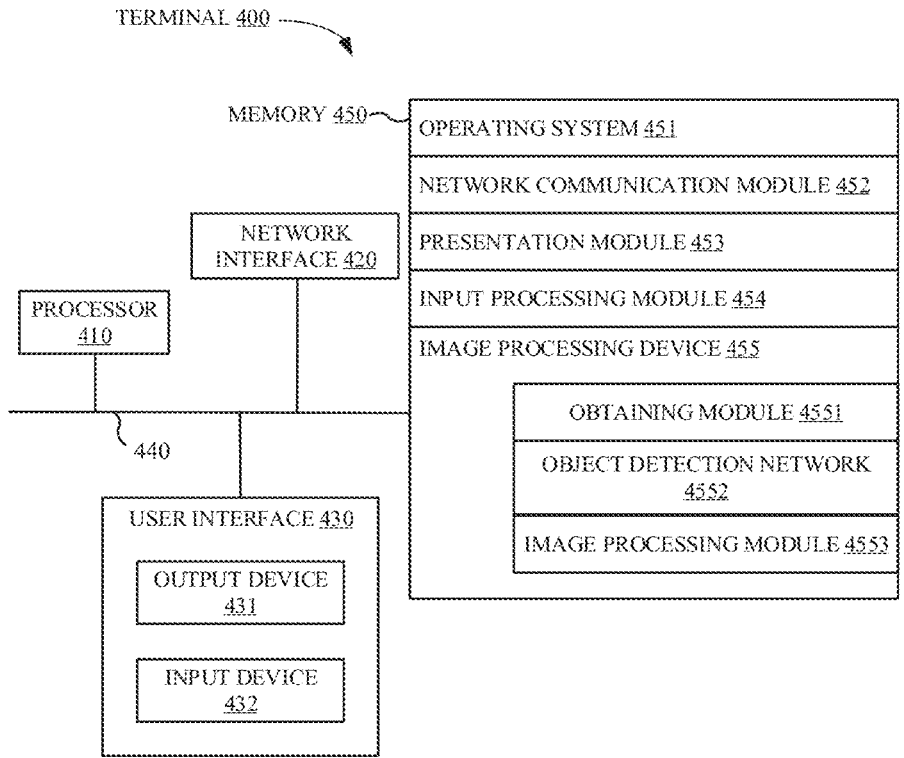
FIG. 3 is an optional schematic structural diagram illustrating an image processing device provided in implementations of the disclosure.

Referring to FIG. 3, FIG. 3 is a schematic structural diagram illustrating a terminal 400 provided in implementations of the disclosure. The terminal 400 illustrated in FIG. 3 includes at least one processor 410, a memory 450, at least one network interface 420, and at least one user interface 430. Various components of the terminal 400 are coupled together via a bus system 440. It is understood that, the bus system 440 is configured to implement connection communication between these components. In addition to a data bus, the bus system 440 may also include a power bus, a control bus, and a status signal bus. However, for the sake of clarity, the various buses are labeled as the bus system 440 in FIG. 3.

The processor 410 may be an integrated circuit chip with signal processing capabilities, such as a general-purpose processor, a digital signal processor (DSP), or other programmable logic devices, a discrete gate or a transistor logic device, a discrete hardware component, etc. The general-purpose processor may be a microprocessor, any conventional processor, or the like.

The user interface 430 may include one or more output devices 431 capable of presenting media contents, and the output device may include one or more speakers and/or one or more visual display screens. The user interface 430 may also include one or more input devices 432, and the input device may include user interface components that facilitate user input, such as a keyboard, a mouse, a microphone, a touch screen display, a camera, and other input buttons and controls.

The memory 450 may be a removable memory, a non-removable memory, or a combination of the two. An exemplary hardware device may include a solid-state memory, a hard drive, an optical drive, and the like. Optionally, the memory 450 may include one or more storage devices that are physically remote from the processor 410.

The memory 450 may include a transitory memory or a non-transitory memory, and may also include both the transitory memory and the non-transitory memory. The non-transitory memory may be a read-only memory (ROM). The transitory memory may be a random access memory (RAM). The memory 450 of implementations of the disclosure is intended to include any suitable type of memory.

In some implementations, the memory 450 can store data to support various operations, and the data may include, for example, programs, modules, and data structures or subsets or supersets thereof, as exemplified below.

An operating system 451 may include system programs for processing various basic system services and performing hardware-related tasks, such as a framework layer, a core library layer, a driver layer, etc., to implement various basic services and process hardware-based tasks.

A network communication module 452 is configured to communicate with other computing devices via one or more (wired or wireless) network interfaces 420. The network interface 420 may include, for example, bluetooth, wireless fidelity (Wi-Fi), and a universal serial bus (USB), etc.

A presentation module 453 is configured to present information through one or more output devices 431 (e.g., a display screen, a speaker, etc.) associated with the user interface 430 (e.g., a user interface for operating peripherals and displaying contents and information).

An input processing module 454 is configured to detect one or more user inputs or interactions from one of the one or more input devices 432 and translate the detected inputs or interactions.

In some implementations, the image processing device of implementations of the disclosure may be implemented in software. FIG. 3 illustrates an image processing device 455 stored in the memory 450, which may be software in a form of programs and plug-ins, and may include software modules such as an obtaining module 4551, an object detection network 4552, and an image processing module 4553. These modules are logically divided, and these modules may be arbitrarily combined or further divided according to functions implemented.

A function of each module will be described below.

In other implementations, the image processing device of implementations of the disclosure may be implemented in hardware. As an example, the image processing device is a processor in a form of a hardware decoding processor, which is programmed to execute an image processing method of implementations of the disclosure. For instance, the processor in the form of the hardware decoding processor may be one or more application specific integrated circuits (ASIC), DSP, programmable logic devices (PLD), complex programmable logic devices (CPLD), field-programmable gate arrays (FPGA), or other electronic components.

The image processing method of implementations of the disclosure will be described with reference to exemplary application and implementations of the terminal of implementations of the disclosure.

Figure 4:
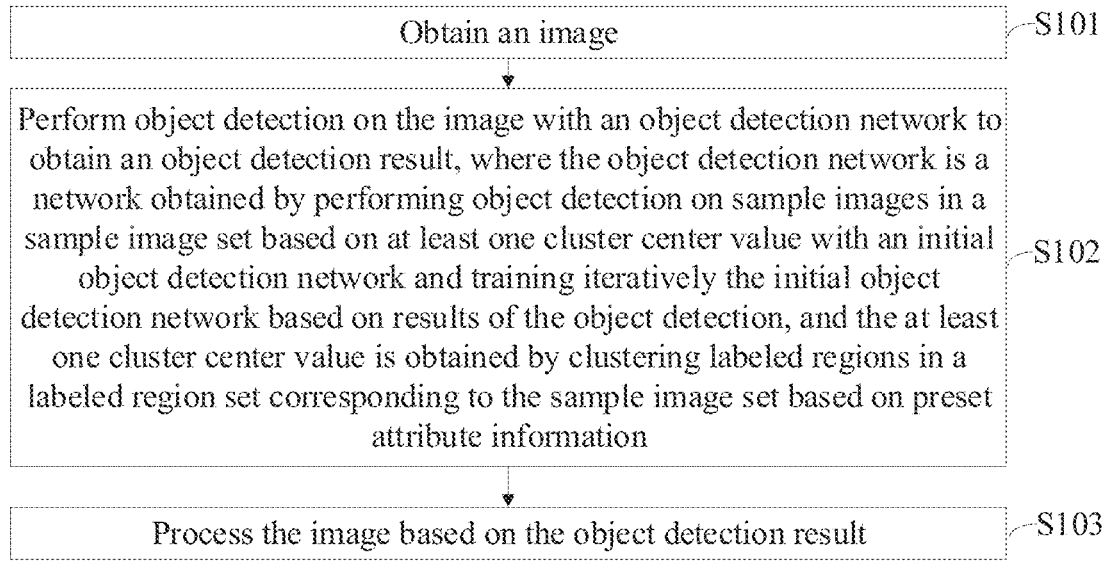
FIG. 4 is an optional schematic flowchart illustrating an image processing method provided in implementations of the disclosure.

Referring to FIG. 4, FIG. 4 is an optional schematic flowchart illustrating an image processing method provided in implementations of the disclosure, which will be described with reference to operations illustrated in FIG. 4.

At S101, an image is obtained.

In implementations of the disclosure, an image processing device may first obtain the image. The image may be a raw image collected, or may be an image obtained through image decoding, image augmentation, cropping on the collected raw image, or other preprocessing.

At S102, object detection is performed on the image with an object detection network to obtain an object detection result, where the object detection network is a network obtained by performing object detection on sample images in a sample image set based on at least one cluster center value with an initial object detection network and training iteratively the initial object detection network based on results of the object detection, and the at least one cluster center value is obtained by clustering labeled regions in a labeled region set corresponding to the sample image set based on preset attribute information.

In implementations of the disclosure, before the image processing device performs object detection with the trained object detection network, the initial object detection network needs to be obtained first, and the initial object detection network is trained to obtain the object detection network. In each round of training, by using the initial object detection network, the image processing device can predict a location and an area size of a preset object contained in each sample image based on at least one cluster center value, as such, multiple prediction regions where the preset object may occupy can be obtained as an object detection result. The initial object detection network is updated iteratively based on a difference between the object detection result of each round of training and a ground-truth labeled region of each sample image. The above iterative training is repeated until a preset training goal is met, to obtain the object detection network.

In implementations of the disclosure, the preset object is a target object to be detected by the initial object detection network from a sample image. In some implementations, in a face unlocking scenario, the preset object is a face.

In implementations of the disclosure, the at least one cluster center value is obtained by clustering labeled regions in the labeled region set corresponding to the sample image set based on the preset attribute information. The labeled region set is a set composed of labeled regions of respective sample images in the sample image set. The image processing device can cluster the labeled region set based on the preset attribute information, to divide the labeled region set into different subsets according to preset attribute information, so that the similarity of labeled regions in a same subset are as large as possible while the similarity of labeled regions in different subsets are as small as possible. That is, each subset respectively represents a type of labeled regions in the labeled region set. For each subset obtained by clustering, the image processing device can obtain a statistical center of the subset through averaging or other methods, and the obtained statistical center is used as a cluster center value corresponding to the subset, to obtain the at least one cluster center value.

In some implementations, the preset attribute information is size information. The image processing device may clustering the labeled region set based on the size of different labeled regions in the labeled region set to obtain the at least one cluster center value. The preset attribute information may also be location information, and the preset attribute information may be selected according to actual situations, which is not limited in implementations of the disclosure.

Figure 5:
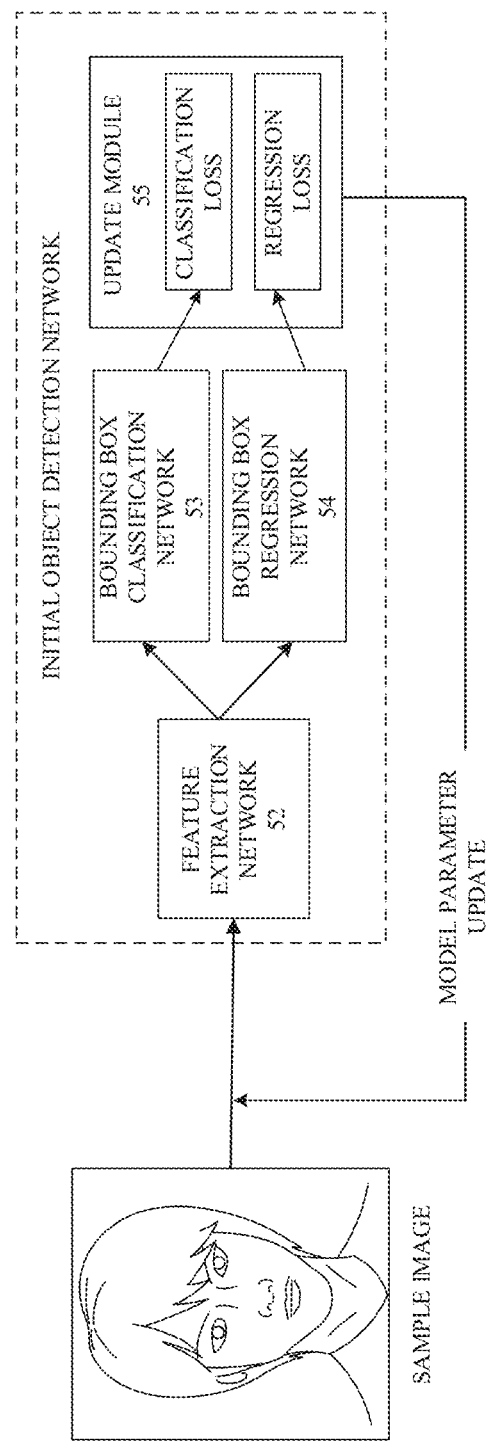
FIG. 5 is an optional schematic flowchart illustrating a training process of an initial object detection network provided in implementations of the disclosure.
Figure 6A:
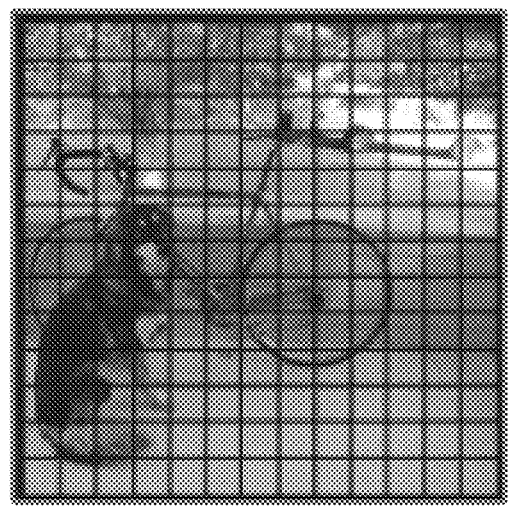
FIG. 6A is an optional schematic effect diagram illustrating a feature map provided in implementations of the disclosure.
Figure 6B:
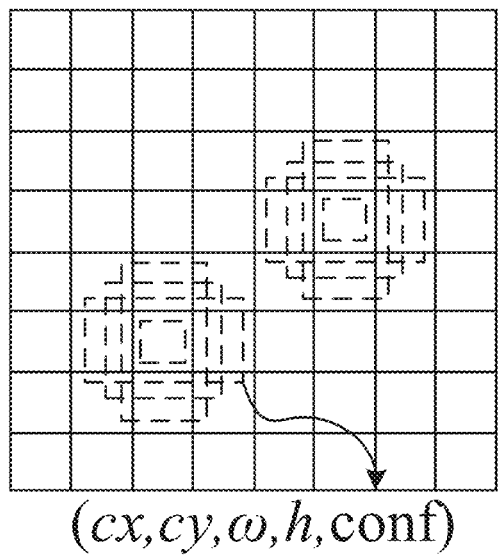
FIG. 6B is an optional schematic effect diagram illustrating preset prior boxes provided in implementations of the disclosure.

In some implementations, the training of the initial object detection network by the image processing device based on the at least one cluster center value is illustrated in FIG. 5. In the present round of training, the image processing device may obtain a present sample image corresponding to the present round of training, and divide the present sample image into multiple grids and extract an image feature of each grid with a feature extraction network 52, to obtain a feature map of the present sample image, as illustrated in FIG. 6A. For each grid, the image processing device may generate at least one preset prior box on the grid based on at least one cluster center value. For example, as illustrated in FIG. 6B, the sample image is divided to be a feature map of 8*8 grids. For one of the 8*8 grids, the image processing device may generate four preset prior boxes corresponding to the grid based on the at least one cluster center value, where widths co and heights h of the four preset prior boxes respectively correspond to cluster center values of four types of widths and heights, a center coordinate (cx, cy) of the grid is used as a location of the four preset prior boxes, and for each preset prior box, a confidence of the preset prior box is obtained by classifying and predicting an image in the preset prior box with a bounding box classification network 53 of the initial object detection network.

Figure 6C:
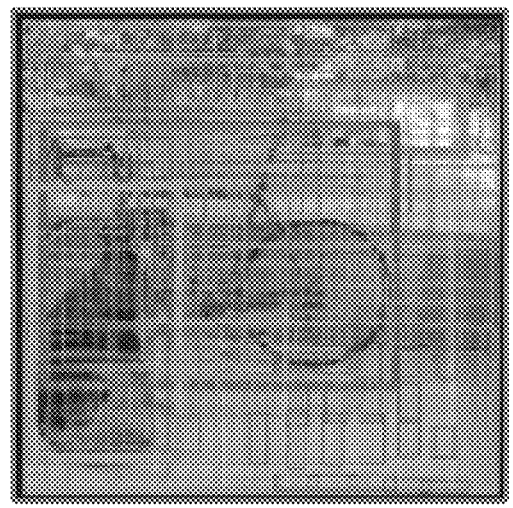
FIG. 6C is an optional schematic effect diagram illustrating a prediction region set provided in implementations of the disclosure.

In implementations of the disclosure, for each divided grid of the present sample image, the image processing device may generate at least one preset prior box corresponding to the grid based on the at least one cluster center value in a same manner. The image processing device may use an image region in each preset prior box as a prediction region, to obtain a prediction region set of the present sample image based on the at least one preset prior box of each grid of the present sample image, as illustrated in FIG. 6C.

In implementations of the disclosure, according to each prediction region in the prediction region set, the image processing device may determine at least one prediction region whose overlap degree with the labeled region of the sample image is greater than an overlap degree threshold, to obtain a positive sample region set of the present round of training.

In implementations of the disclosure, the labeled region of the sample image is a ground-truth region where the preset object in the sample image is located. In some implementations, the labeled region may be obtained by labeling the sample image manually.

Figure 7:
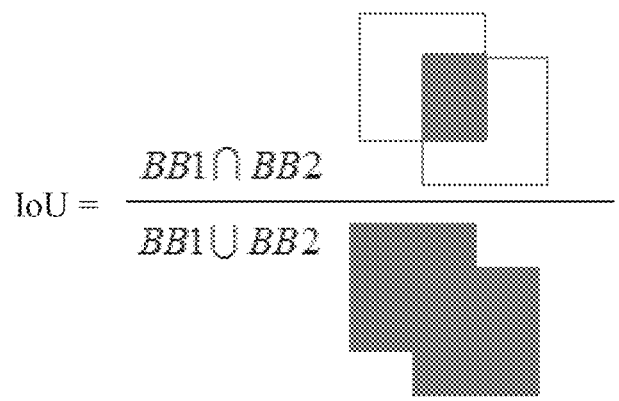
FIG. 7 is a schematic diagram illustrating a method for calculating an overlap degree provided in implementations of the disclosure.

In some implementations, the image processing device may evaluate an overlap degree between a prediction region and a labeled region according to intersection over union (IoU), where IoU=an overlapped region/a union region. As an example, prediction region 1 is represented by BB1 and labeled region 2 is represented by BB2, an overlap degree between prediction region 1 and labeled region 2 can be calculated according to a formula illustrated in FIG. 7.

In implementations of the disclosure, in the present round of training, according to a bounding-box filtering and screening algorithm, the image processing device may select from the positive sample region set a positive sample region that is closest to the labeled region as a target positive sample region. With a bounding box regression network 54 of the initial object detection network, the image processing device may learn, according to each positive sample region in the positive sample region set and the labeled region, a location mapping and a size mapping between the positive sample region and the labeled region. The image processing device may adjust the size and location of the target positive sample region according to the learned location mapping and the learned size mapping, that is, bounding box regression, so that the target positive sample region is close to the labeled region. Finally, the adjusted target positive sample region is determined as a target prediction region obtained in the present round of training, and is output as the output result of the present round of training.

In implementations of the disclosure, the image processing device may obtain a regression loss of the present round of training according to an error between the target prediction region and the labeled region, and obtain a classification loss of the present round of training based on a labeled classification result and a confidence of the target prediction region. The image processing device may update a model parameter of the initial object detection network based on the classification loss and the regression loss through an update module 55. A new round of training is performed with the updated model parameter until a preset training goal is reached, for example, the number of iterations reaches a preset number or the error between the target prediction region and the labeled region is less than an error threshold, to obtain the object detection network.

In implementations of the disclosure, with the trained object detection network, the image processing device may perform object detection on the image to obtain the object detection result. As an example, in a face unlocking scenario, the object detection network can be a face detection model, the image processing device may perform object detection on an image which is collected by a front-facing camera and to be used for unlocking, to determine from the image a face image which is to be used for unlocking as the object detection result. Alternatively, in a traffic monitoring scenario, the object detection network can be a vehicle detection model, and with the vehicle detection model, the image processing device may perform object detection on a vehicle image captured by a surveillance camera to determine a target vehicle.

At S103, the image is processed based on the object detection result.

In implementations of the disclosure, once the object detection result is obtained through the object detection network, the image processing device may further perform different image processing on the image based on the object detection result according to needs of practical engineering applications.

In some implementations, in a face unlocking scenario, the object detection result can be a face to be used for unlocking, the image processing device may perform image verification on the face and determine whether a terminal can be unlocked with the "face". In an automatic driving scenario, the object detection result can be a traffic sign or an obstacle, the image processing device may further perform image analysis on the traffic sign or the obstacle to generate a corresponding driving operation instruction, etc., and the object detection result may be selected according to actual situations, which is not limited in implementations of the disclosure.

It can be understood that, in implementations of the disclosure, during training of the initial object detection network, the at least one cluster center value obtained by clustering the labeled region set corresponding to the sample image set is used to constrain an object detection result (i.e., a predicted bounding box) outputted by the initial object detection network, which can increase an overlap degree between the predicted bounding box and the labeled region. As such, the number of positive samples for training can be increased, so that the initial object detection network can learn based on more positive samples, thereby improving the accuracy of object detection based on the object detection network.

Figure 8:
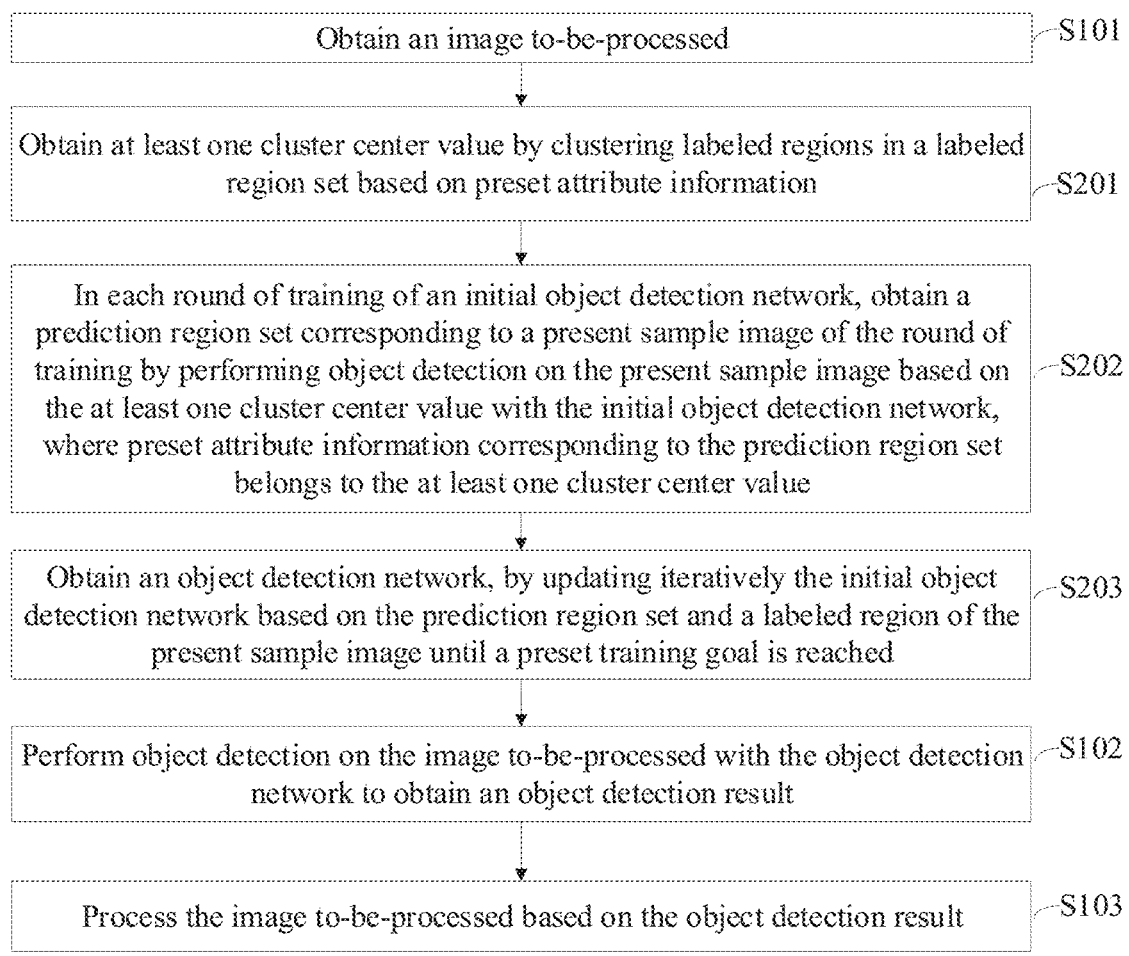
FIG. 8 is an optional schematic flowchart illustrating an image processing method provided in implementations of the disclosure.

In some implementations, referring to FIG. 8, FIG. 8 is an optional schematic flowchart illustrating an image processing method provided in implementations of the disclosure. Based on FIG. 4, after the operations at S101, operations at S201-S203 may be further performed, which will be described in detail below.

At S201, the at least one cluster center value is obtained by clustering the labeled regions in the labeled region set based on the preset attribute information.

In implementations of the disclosure, the image processing device can obtain a labeled region contained in each image to obtain a labeled region set, and cluster the labeled region set according to the preset attribute information to obtain the at least one cluster center value.

Figure 9:
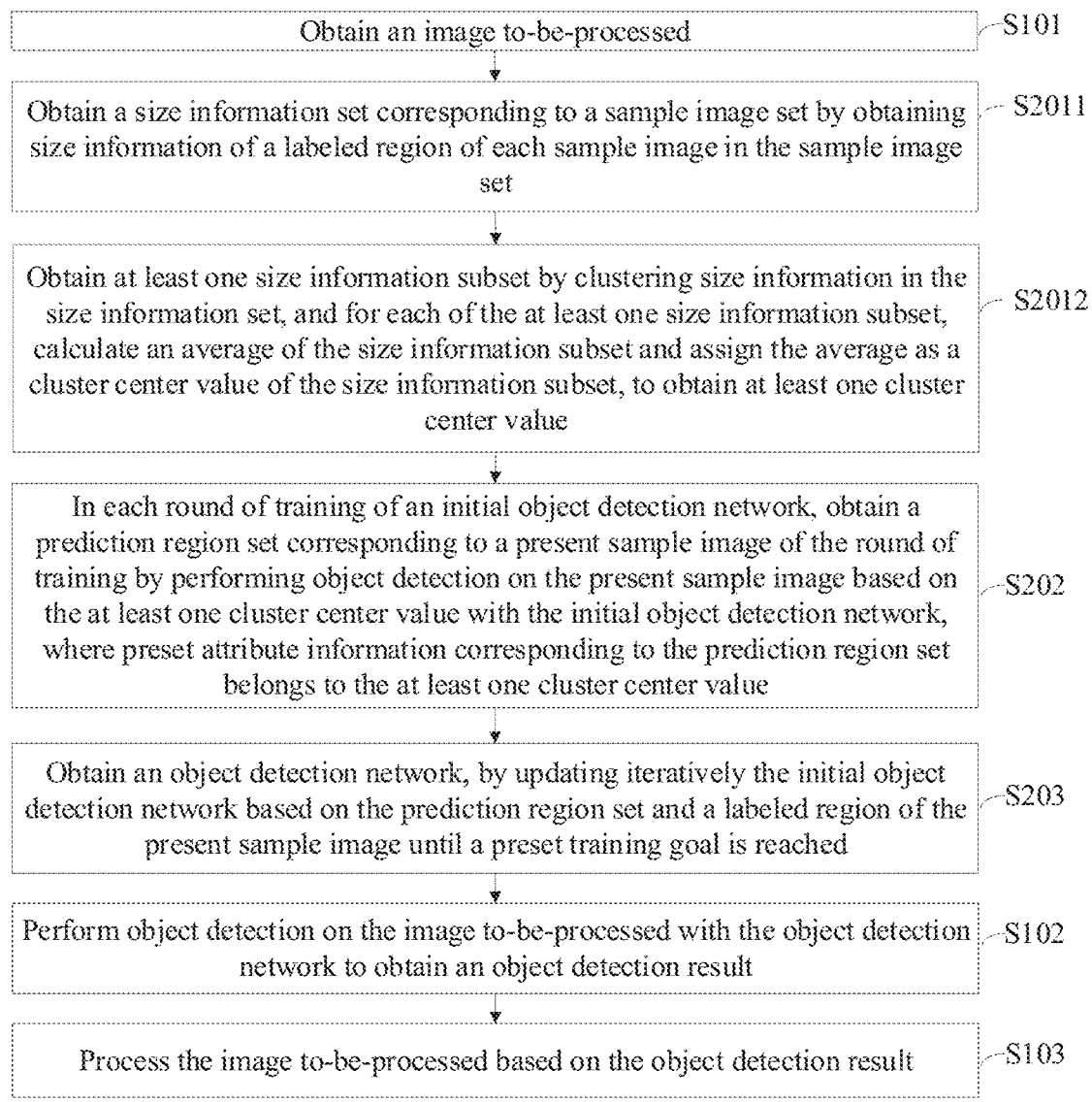
FIG. 9 is an optional schematic flowchart illustrating an image processing method provided in implementations of the disclosure.

In some implementations, referring to FIG. 9, FIG. 9 is an optional schematic flowchart illustrating an image processing method provided in implementations of the disclosure. If the preset attribute information is a size category, based on FIG. 8, the operations at S201 may be performed through operations at S2011-S2012, which will be described in detail below.

At S2011, a size information set corresponding to the sample image set is obtained by obtaining size information of a labeled region of each sample image in the sample image set.

In implementations of the disclosure, the image processing device can obtain the size information of the labeled region of each sample image, to obtain the size information set corresponding to the sample image set.

In some implementations, if the labeled region is a rectangular region, the image processing device may obtain a width and a height of the rectangular region as size information corresponding to the sample image, to obtain the size information set corresponding to the sample image set.

In some implementations, a rectangular labeled region of each sample image in the sample image set is represented by $G^i$, where $G^i=(G_x^i, G_y^i, G_w^i, G_h^i)$, $G_x^i$ and $G_y^i$ represent coordinates of a center of the $i^{th}$ rectangular labeled region in the $i^{th}$ sample image, $G_w^i$ represents the width of the $i^{th}$ labeled region, and $G_h^i$ represents the height of the $i^{th}$ labeled region. The image processing device may determine $<G_w^i, G_h^i>$ as size information of the $i^{th}$ labeled region in the $i^{th}$ sample image, and perform a same processing on the sample image set to obtain the size information set $\{<G_w^i, G_h^i>\}$.

At S2012, at least one size information subset is obtained by clustering size information in the size information set, and for each of the at least one size information subset, an average of the size information subset is calculated and the average is assigned as a cluster center value of the size information subset, to obtain the at least one cluster center value.

In implementations of the disclosure, when obtaining the size information set corresponding to the sample image set, the image processing device may first generate randomly at least one cluster centroid through a clustering algorithm. For each size information in the size information set, the image processing device may classify the size information to a cluster centroid closest to the size information, that is, a cluster centroid having the smallest error with the size information, to obtain the at least one size information subset.

In implementations of the disclosure, for a size information subset, the image processing device may calculate an average of all size information in the size information subset, and assign the average as a cluster center value of the size information subset. The image processing device processes each of the at least one size information subset in a same manner, to obtain the at least one cluster center value.

In some implementations, the image processing device may use a K-means algorithm or other clustering algorithms, and the algorithm may be selected according to actual situations, which is not limited in implementations of the disclosure.

In some implementations, if the size information is the width and the height of a rectangular labeled region, for each size information subset, the image processing device may calculate an average of widths corresponding to all size information in the size information subset and an average of heights corresponding to all size information in the size information subset, and assign the average of widths and the average of heights as a cluster center value corresponding to the size information subset.

In some implementations, for the sample image set applied to the object detection network for face unlocking, since a total size of the face unlocking-related sample image is generally 640*400, and a ratio of a ground-truth labeled region of a face in the sample image to the total size generally ranges from 0.3 to 0.9, the image processing device may generate randomly twelve widths and twelve heights as cluster centroids, and cluster the size information set of the labeled regions corresponding to the sample image set. Finally, the following twelve cluster center values are obtained: {<70, 95>, <99, 135>, <124, 168>, <145, 198>, <166, 226>, <185, 252>, <203, 276>, <221, 300>, <239, 325>, <256, 348>, <273, 371>, <311, 372>}.

At S202, in each round of training of the initial object detection network, a prediction region set corresponding to a present sample image of the round of training is obtained by performing object detection on the present sample image based on the at least one cluster center value with the initial object detection network, where preset attribute information corresponding to the prediction region set belongs to the at least one cluster center value.

In implementations of the disclosure, the prediction region set outputted by the initial object detection network may include at least one category of attribute information. In each round of training of the initial object detection network, the image processing device can set preset attribute information corresponding to the prediction region set more reasonably with aid of the at least one cluster center value, perform object detection on a preset object contained in the present sample image used in the round of training according to attribute information corresponding to the prediction region set which are set reasonably in advance, and further predict other categories of attribute information corresponding to the prediction region set, to obtain the prediction region set corresponding to the present sample image.

Figure 10:
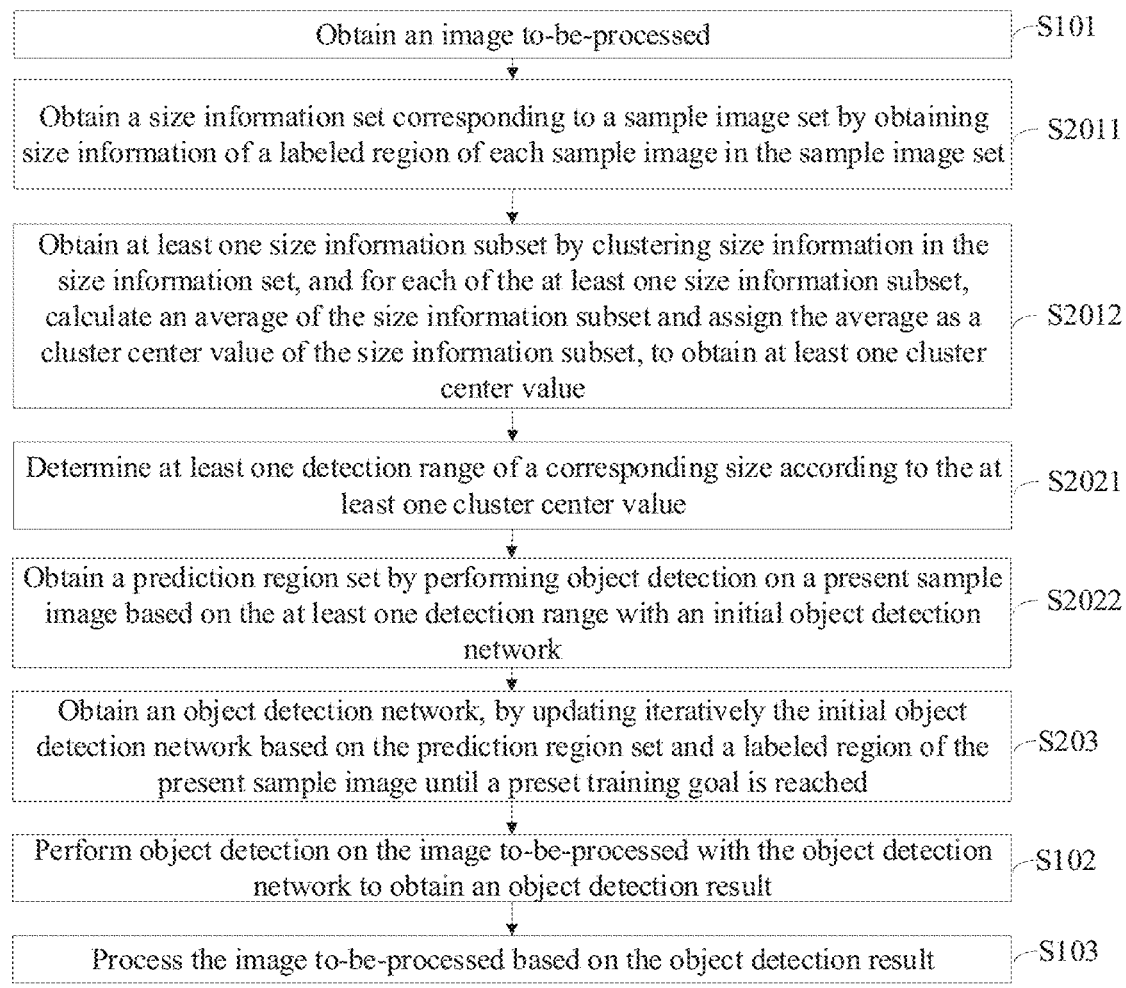
FIG. 10 is an optional schematic flowchart illustrating an image processing method provided in implementations of the disclosure.

In some implementations, referring to FIG. 10, FIG. 10 is an optional schematic flowchart illustrating an image processing method provided in implementations of the disclosure. If the preset attribute information is size information, based on FIG. 8 or FIG. 9, the operations at S202 may be implemented through operations at S2021-S2022, which will be described in detail below.

At S2021, at least one detection range of a corresponding size is determined according to the at least one cluster center value.

In implementations of the disclosure, in each round of training, when performing object detection on the present sample image used in the present round of training through the initial object detection network, according to a feature map of the present sample image, the image processing device may perform object detection on each grid of the feature map by using at least one detection range of a determined size. In this situation, the image processing device may assign the at least one cluster center value as size information corresponding to the at least one detection range.

At S2022, the prediction region set is obtained by performing object detection on the present sample image based on the at least one detection range with the initial object detection network.

In implementations of the disclosure, the image processing device may use a location of a center of each grid as a center of the at least one detection range, and perform object detection on an image contained in the at least one detection range to obtain a confidence corresponding to each detection range. Further, the image processing device may use the center of the at least one detection range as location information of the at least one detection range. At least one detection range having determined location information, a determined confidence, and determined size information is determined to obtain a prediction region subset corresponding to each grid. In this way, a prediction region set is obtained based on all grids of the feature map corresponding to the present sample image. As such, based on the at least one cluster center value, the image processing device can pre-constrain the size of the prediction region set outputted by the initial object detection network, so that the size of the prediction region set can be close to that of the labeled region set, which can increase the proportion of positive samples in the prediction region set.

In some implementations, if the preset attribute information is size information, the at least one cluster center value may be obtained by clustering heights and widths of the labeled region set. The at least one cluster center value for example are the above twelve cluster center values obtained at S2012: {<70, 95>, <99, 135>, <124, 168>, <145, 198>, <166, 226>, <185, 252>, <203, 276>, <221, 300>, <239, 325>, <256, 348>, <273, 371>, <311, 372>}. Based on the training process illustrated in FIG. 5 to FIG. 6C, the image processing device may set the initial object detection network in advance and generate twelve detection ranges for each grid. The detection ranges have sizes in one-to-one correspondence with the twelve cluster center values. Object detection is performed on the present sample image based on the twelve detection ranges on each grid, to obtain the prediction region set. The size of each prediction region in the prediction region set also belongs to any one of the twelve cluster center values.

At S203, the initial object detection network is updated iteratively based on the prediction region set and a labeled region of the present sample image until a preset training goal is reached, to obtain the object detection network.

In implementations of the disclosure, the image processing device allows the initial object detection network to gradually learn a size mapping and a location mapping between the prediction region outputted by a model and the labeled region based on the prediction region set and the labeled region of the present sample image. Bounding box regression is performed according to the mapping learned in each round of training, to obtain an output of each round of training. The initial object detection network is updated iteratively based on the output of each round of training until the preset training goal is reached, to obtain the object detection network.

Figure 11:
FIG. 11 is an optional schematic flowchart illustrating an image processing method provided in implementations of the disclosure.

In some implementations, referring to FIG. 11, FIG. 11 is an optional schematic flowchart illustrating an image processing method provided in implementations of the disclosure. The operations at S203 in FIG. 8 to FIG. 10 may be implemented through operations at S2031-S2036, which will be described in detail below.

At S2031, for each round of training, in the prediction region set, a prediction region having an overlap degree with the labeled region greater than an overlap degree threshold is determined, to obtain a positive sample region set.

In implementations of the disclosure, in each round of training, the image processing device may determine from the prediction region set a prediction region which has an overlap degree with the labeled region greater than the overlap degree threshold, to obtain the positive sample region set.

In some implementations, if the overlap degree is represented by IoU and the overlap degree threshold is 0.6, the image processing device may calculate the IoU between each prediction region in the prediction region set and the labeled region, and classify a prediction region having more than 0.6 IoU as a positive sample region, thereby obtaining the positive sample region set.

In some implementations, the image processing device may further filter positive sample regions in the positive sample region set based on the confidence through non-maximum suppression (NMS) algorithm and the like, to remove a positive sample region with a relatively low confidence from the positive sample region set, so that the positive sample set is further updated.

It should be noted that, in some implementations, the image processing device may also determine a prediction region having an overlap degree with the labeled region less than the overlap degree threshold, to obtain a negative sample region set. During the training, the initial object detection network may also be trained with the negative sample region set, so that comparative learning can be achieved based on of the positive sample region set and the negative sample region set, and a training effect of the initial object detection network can be improved.

At S2032, for each positive sample region in the positive sample region set, at least one mapping value in at least one spatial dimension between the positive sample region and the labeled region is calculated according to a preset mapping, where the at least one mapping value is a transformation amount in the at least one spatial dimension required to map the positive sample region to the labeled region.

In implementations of the disclosure, for each positive sample region in the positive sample region set, with the initial object detection network, the image processing device may calculate, according to the preset mapping, the at least one mapping value in the at least one spatial dimension between the positive sample region and the labeled region. The at least one mapping value is the transformation amount in the at least one spatial dimension required to map the positive sample region to the labeled region.

In some implementations, the at least one spatial dimension may be a translation dimension and a scale transformation dimension, the at least one mapping value is a translation amount of location coordinates of a center and a transformation amount of a height and a width when mapping the positive sample region to the labeled region, which can be expressed as formula (1):

$$t_x = (G_x - P_x)/P_w$$

$$t_y = (G_y - P_y)/P_h$$

$$t_w = \log(G_w - P_w)$$

$$t_h = \log(G_h - P_h) \tag{1}$$

In formula (1), $G_x$ and $G_y$ represent coordinates of a center of the labeled region, $G_w$ represents a width of the labeled region, and $G_h$ represents a height of the labeled region. $P_x$ and $P_y$ represent coordinates of a center of a positive sample region in the positive sample region set, $P_w$ represents a width of the positive sample region, and $P_h$ represents a height of the positive sample region. The at least one mapping value obtained by the image processing device through calculation based on formula (1) is the translation amount $t_x$, $t_y$ of the coordinates of the center and the transformation amount of the height $t_h$ and the width $t_w$ when mapping the positive sample region to the labeled region.

At S2033, a regression loss of the initial object detection network is obtained according to the at least one mapping value and at least one preset mapping value.

In implementations of the disclosure, the image processing device may compare the at least one calculated mapping value and the at least one preset mapping value, to obtain an error as the regression loss of the initial object detection network in the present round.

In some implementations, the image processing device may calculate an error between the at least one mapping value and the at least one preset mapping value as the regression loss by means of a smooth function.

At S2034, a confidence of each positive sample region is obtained, and a classification loss of the initial object detection network is obtained according to the confidence and a preset confidence.

In implementations of the disclosure, the image processing device may obtain the confidence of each positive sample region, and obtain the classification loss of the initial object detection network according to an error between the confidence and the preset confidence.

In some implementations, the image processing device may calculate an error between a confidence of each positive sample region and the preset confidence as the classification loss of the initial object detection network by means of a cross-entropy loss.

At S2035, a comprehensive loss of the initial object detection network is obtained based on the regression loss and the classification loss.

At S2036, a parameter of the initial object detection network is updated iteratively based on the comprehensive loss until the preset training goal is reached, to obtain the object detection network.

In implementations of the disclosure, the image processing device can comprehensively evaluate a training result of the initial object detection network in the present round based on the regression loss and the classification loss, to obtain the comprehensive loss of the initial object detection network. The parameter of the initial object detection network is updated iteratively based on the comprehensive loss until the preset training goal is reached, to obtain the object detection network.

It can be understood that, in implementations of the disclosure, during training of the initial object detection network, the at least one cluster center value obtained by clustering the labeled region set corresponding to the sample image set is used to constrain an object detection result (i.e., a predicted bounding box) outputted by the initial object detection network, which can increase an overlap degree between the predicted bounding box and the labeled region. As such, the number of positive samples for training can be increased, so that the initial object detection network can learn based on more positive samples, thereby improving the accuracy of object detection based on the object detection network.

Figure 12:
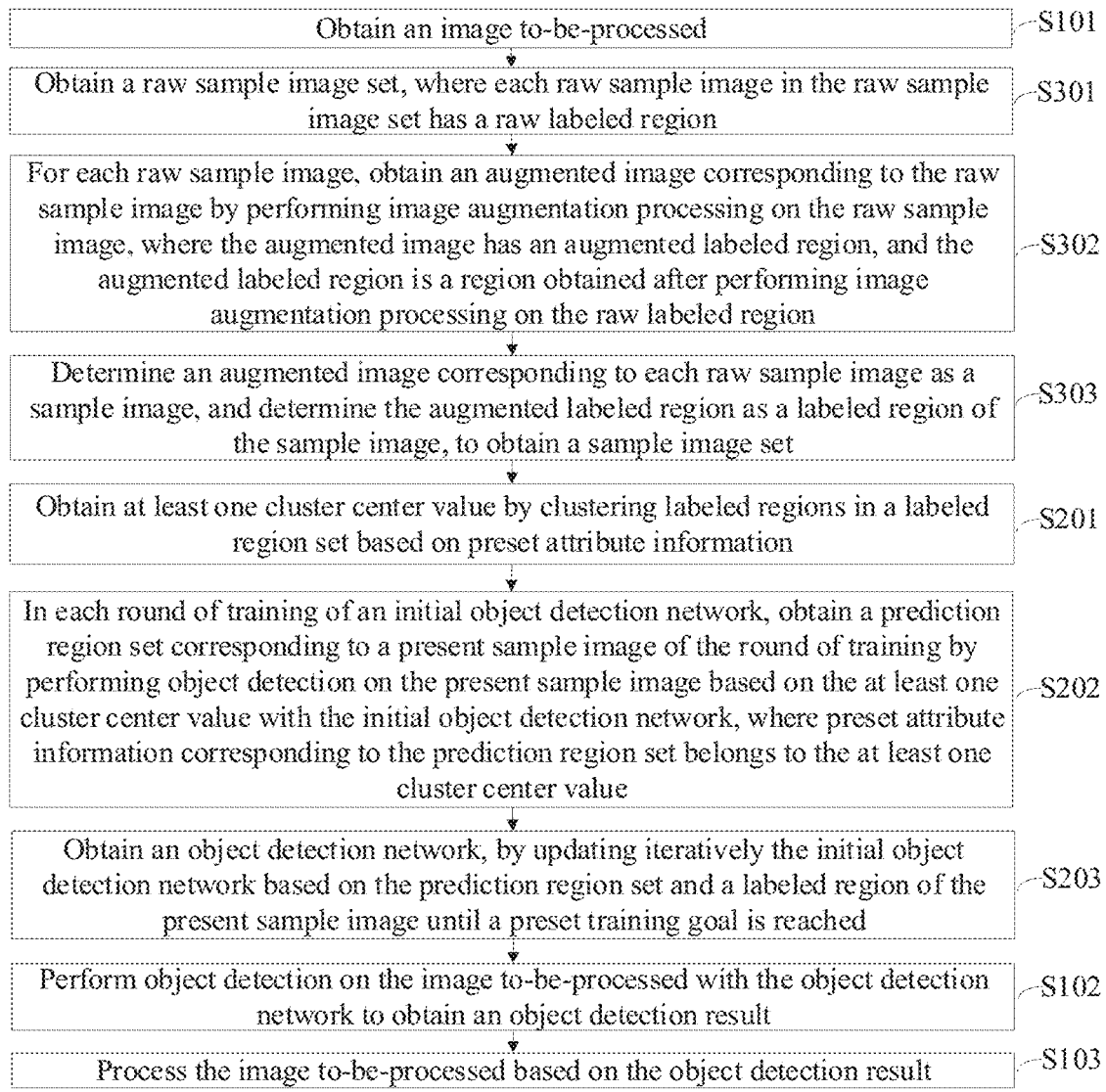
FIG. 12 is an optional schematic flowchart illustrating an image processing method provided in implementations of the disclosure.

In some implementations, referring to FIG. 12, FIG. 12 is an optional schematic flowchart illustrating an image processing method provided in implementations of the disclosure. Based on FIG. 8, before the operations at S201, operations at S301 to S303 may be further performed, which will be described in detail below.

At S301, a raw sample image set is obtained, where each raw sample image in the raw sample image set has a raw labeled region.

In implementations of the disclosure, the image processing device may obtain a raw sample image set to be used in training, where each raw sample image has a raw labeled region.

In implementations of the disclosure, the raw labeled region in each raw sample image is a ground-truth region corresponding to a preset object.

At S302, for each raw sample image, an augmented image corresponding to the raw sample image is obtained by performing image augmentation processing on the raw sample image, where the augmented image has an augmented labeled region, and the augmented labeled region is a region obtained after performing image augmentation processing on the raw labeled region.

Figure 13:
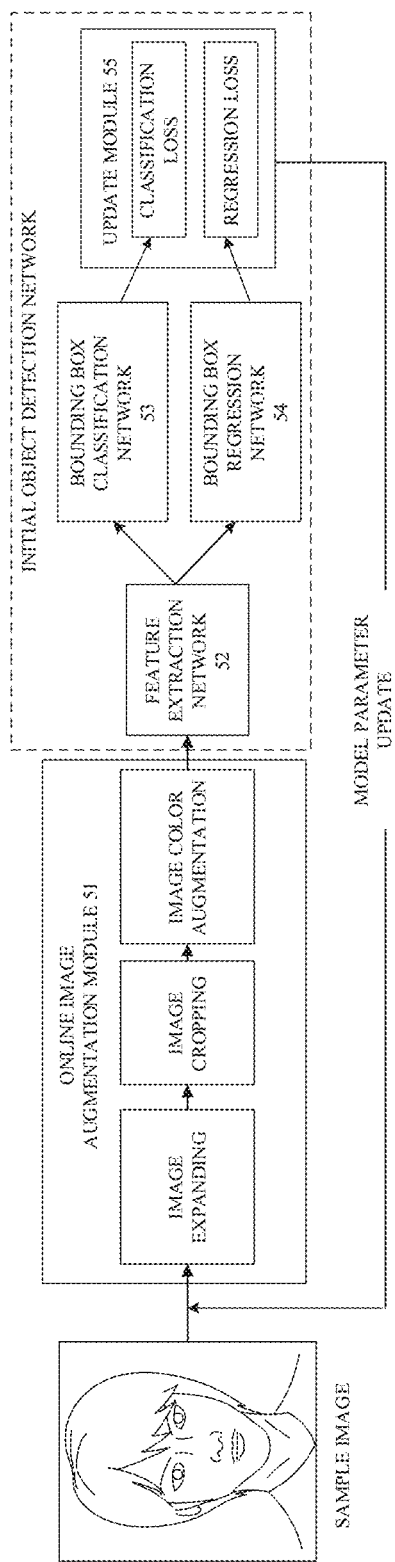
FIG. 13 is an optional schematic flowchart illustrating a training process of an initial object detection network provided in implementations of the disclosure.

In implementations of the disclosure, since the location and the size of a preset object image (e.g., a face image) in an image collected in a real scene are diverse, in order to increase diversity of sample images to make the initial object detection network learn more about a real size and a real location of a face in a photo, before each round of training, the image processing device may perform online image augmentation on a sample image used in the present round of training. For example, as illustrated in FIG. 13, based on a training process of the initial object detection network illustrated in FIG. 5, before each round of training, the image processing device may process randomly the sample image with an online image augmentation module 51, such as image expanding, image cropping, and image color augmentation, to obtain an augmented sample image. Compared with the raw sample images, the diversity of the augmented sample images is increased. However, during the online image augmentation of the sample image, the labeled region of the sample image may change and shift when the sample image is expanded or cropped, which in turn leads to an error in bounding box regression using the sample image. In implementations of the disclosure, in order to reduce the influence of the online image augmentation on the labeled region, before obtaining a sample image set for training, the image processing device may first perform image augmentation preprocessing on each sample image in a raw sample image set, so that the labeled region in the sample image is adjusted to an image augmentation state through the preprocessing, which can reduce influence of the online image augmentation on the labeled region, thereby ensuring an accuracy of bounding box regression.

In implementations of the disclosure, the image augmentation preprocessing is consistent with the online image augmentation, for details of the image augmentation preprocessing, reference may be made to operations at S401-S403 described below.

At S303, an augmented image corresponding to each raw sample image is determined as a sample image, and the augmented labeled region is determined as a labeled region of the sample image, to obtain the sample image set.

In implementations of the disclosure, after performing image augmentation preprocessing on each sample image in the raw sample image set, the image processing device may determine an augmented image corresponding to each raw sample image as a sample image, and determine an augmented labeled region as a labeled region of the sample image, to obtain a sample image set. Thereafter, the initial object detection network is trained based on the sample image set subjected to image augmentation preprocessing.

It can be understood that, in implementations of the disclosure, the image processing device can obtain the sample image set by performing image augmentation preprocessing on the raw sample image set, which can improve an accuracy of the labeled region of the sample image, and accordingly, an accuracy of a model trained based on the sample images can be improved, and an accuracy of object detection based on the trained object detection network.

Figure 14:
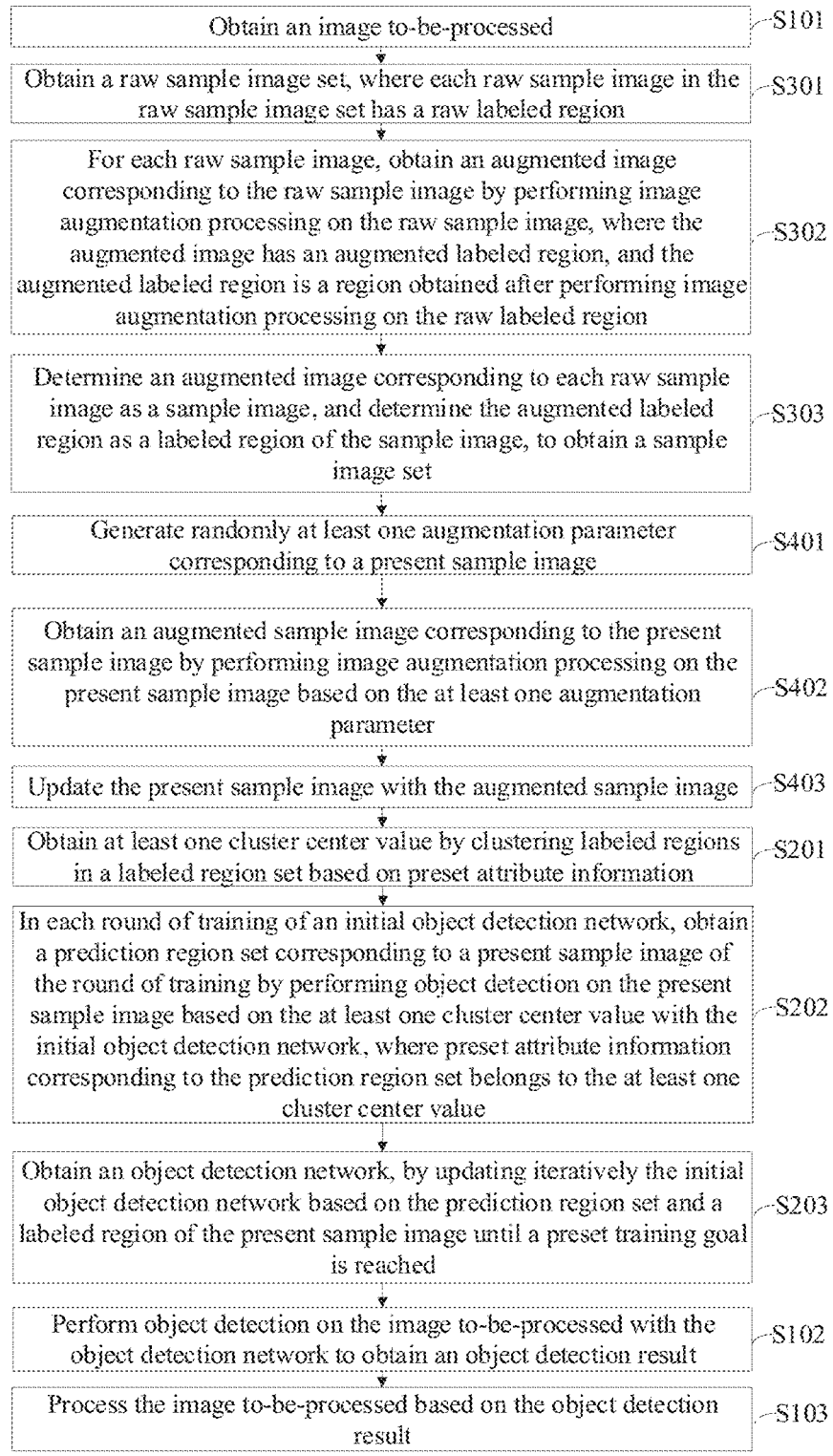
FIG. 14 is an optional schematic flowchart illustrating an image processing method provided in implementations of the disclosure.

In some implementations, referring to FIG. 14, FIG. 14 is an optional schematic flowchart illustrating an image processing method provided in implementations of the disclosure. Based on FIG. 8 or FIG. 12, before the operations at S201, operations at S401 to S403 may be further performed, which will be described in detail below.

At S401, at least one augmentation parameter corresponding to the present sample image is generated randomly.

In implementations of the disclosure, for the online image augmentation, before each round of training, the image processing device may generate at least one augmentation parameter corresponding to the present sample image of the round of training randomly.

In implementations of the disclosure, the at least one augmentation parameter may include a scaling factor, a pasting location, a cropping size, a cropping location, and a brightness adjustment parameter.

At S402, an augmented sample image corresponding to the present sample image is obtained by performing image augmentation processing on the present sample image based on the at least one augmentation parameter.

In implementations of the disclosure, in the present round of training, the image processing device may perform image augmentation processing on the present sample image of the present round of training based on at least one augmentation parameter of the present round of training, to obtain an augmented sample image corresponding to the present sample image. The image processing device can perform a same process in each round of training.

In some implementations, if the at least one augmentation parameter includes a scaling factor, a pasting location, a cropping size, and a cropping location, the operations at S402 may be implemented through operations at S4021-S4024, which will be described in detail below.

At S4021, a base canvas of a corresponding size is obtained based on a size of the present sample image and the scaling factor, where the scaling factor is greater than zero, and is less than or equal to a scaling threshold.

Figure 15:
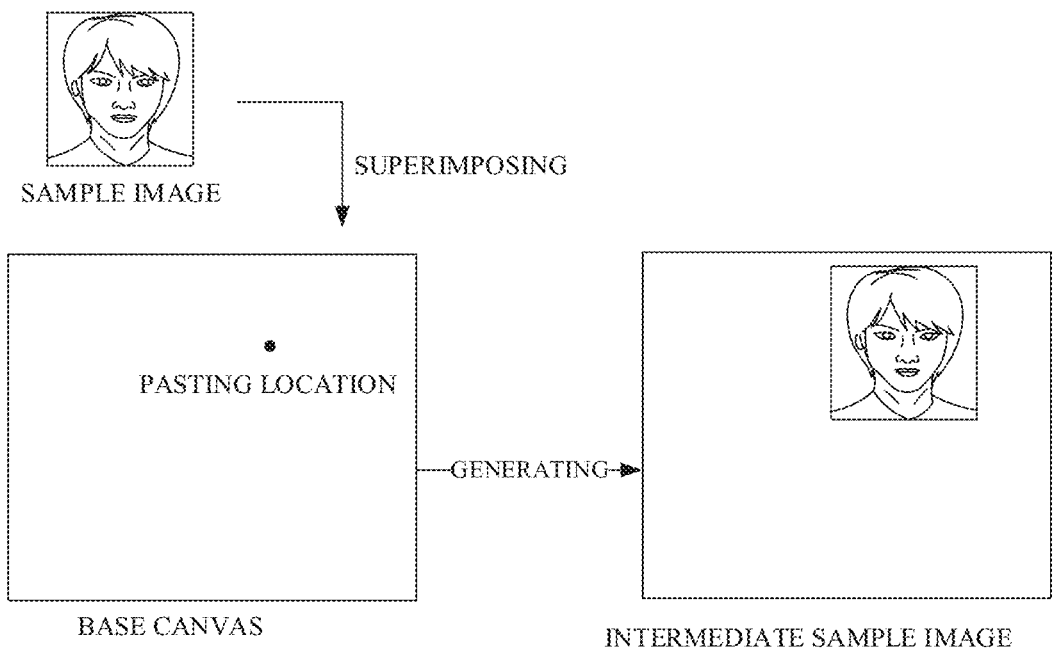
FIG. 15 is a schematic diagram illustrating a process for generating an intermediate sample image provided in implementations of the disclosure.

In implementations of the disclosure, the image processing device may multiply the width and the height of each sample image by a randomly generated scaling factor, to obtain the base canvas of the corresponding size, as illustrated in FIG. 15.

In implementations of the disclosure, the scaling factor is greater than zero, and is less than or equal to the scaling threshold. In some implementations, the scaling factor is 3.

At S4022, an intermediate sample image is obtained by superimposing the present sample image at a pasting location on the base canvas.

In implementations of the disclosure, the image processing device may paste a center of the present sample image at a randomly determined pasting location on the base canvas, to obtain the intermediate sample image, as illustrated in FIG. 15.

At S4023, a cropping window is determined according to the cropping location and the cropping size, and a cropped image is obtained by cropping the intermediate sample image according to the cropping window, where the cropping window is a square window in the intermediate sample image that surrounds a labeled region of the present sample image.

At S4024, the cropped image is determined as the augmented sample image.

In implementations of the disclosure, according to a randomly generated cropping location and a randomly generated cropping size, and with the cropping location as a center, the image processing device may determine a cropping window of the cropping size on the intermediate sample image. The image processing device may crop and cut the intermediate sample image according to the determined cropping window to obtain a cropped image, where the cropping window is within the intermediate sample image and contain the labeled region of the present sample image.

Figure 16:
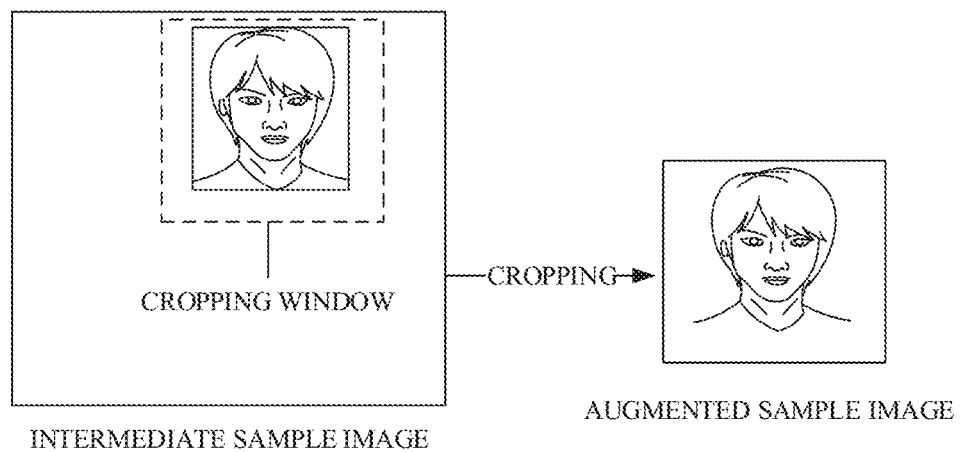
FIG. 16 is a schematic diagram illustrating a process for generating an augmented sample image provided in implementations of the disclosure.

In some implementations, the cropping window may be a 384*384 square region. After obtaining the cropped image according to the cropping window, the image processing device may determine the cropped image as the augmented sample image, as illustrated in FIG. 16.

At S403, the present sample image is updated with the augmented sample image.

In implementations of the disclosure, the image processing device may update a sample image used in the present round of training with an augmented sample image of the present round of training. The image processing device performs a same processing in each round of training, to complete update of each sample image.

In some implementations, if the at least one augmentation parameter includes a brightness adjustment parameter, the operations at S402 may be implemented through operations at S4025, which will be described in detail below.

At S4025, the augmented sample image is obtained by adjusting and augmenting a brightness of the sample image according to the brightness adjustment parameter.

In implementations of the disclosure, the image processing device may adjust a brightness of the sample image according to a randomly generated brightness adjustment parameter to obtain the augmented sample image, which can well simulate images to-be-processed which are collected under different lighting conditions.

In some implementations, the brightness adjustment parameter may range in [−15, 15].

It should be noted that, in implementations of the disclosure, the image processing device may also adjust and augment a brightness of the cropped image according to the brightness adjustment parameter after the operations at S4023, to obtain the augmented sample image.

It can be understood that, in implementations of the disclosure, the image processing device can increase the diversity of sample images by means of the online image augmentation, so that the initial object detection network can learn more about a real size and a real location of a face in a photo, which is conducive to improving a training effect of the initial object detection network, thereby improving the accuracy of object detection based on the object detection network.

In the following, an exemplary application of the trained object detection network of implementations of the disclosure will be described in conjunction with a practical application scenario.

Figure 17:
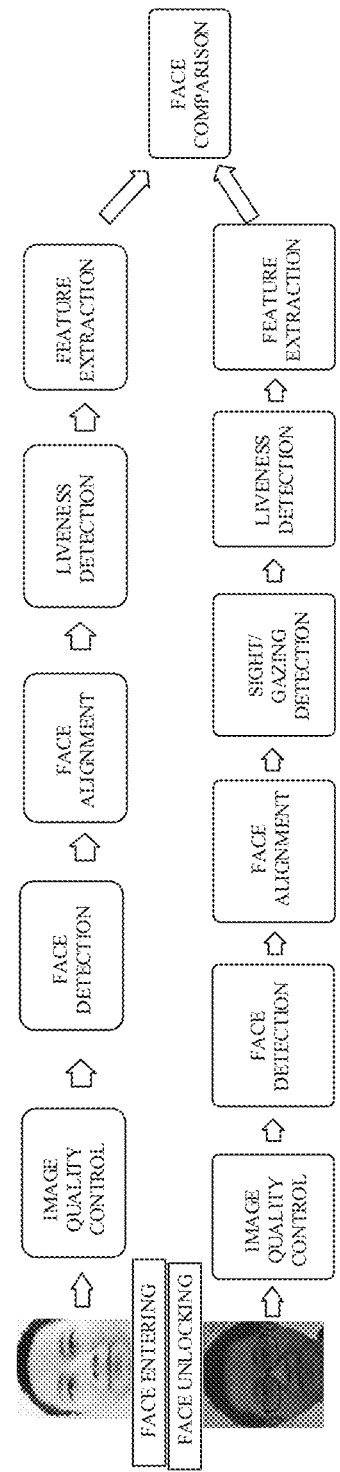
FIG. 17 is a schematic diagram illustrating a face unlocking process using an object detection network provided in implementations of the disclosure.

In some implementations, FIG. 17 illustrates a face unlocking process. In a face entering process illustrated in FIG. 17, a terminal performs image quality control on a collected image to-be-entered which contains an owner's face, to avoid collecting a face image which is too dark or too bright, or contains an unclear and incomplete face. Then, in a face detection process, the owner's face is extracted from the image to-be-entered with the object detection network by means of the method of implementations of the disclosure, to determine as a standard face image. In a face alignment process, key facial feature points such as eyes, a nose tip, mouth corners, eyebrows, and contour points of various parts of the face are located from the standard face image automatically. Liveness detection (or called living body detection) is performed on the key facial feature points, to ensure that the entering is from real people and to prevent mask attacks. Finally, feature extraction is performed on the key facial feature points after the liveness detection on the key facial feature points passes, and extracted features are determined as standard facial features, to be pre-stored on the terminal or a server. In a face unlocking process, the terminal performs image quality control on a collected image which is to be used for unlocking. Then, the terminal extracts a target face from the image with the object detection network by means of the method of implementations of the disclosure in a face detection process, and performs face alignment on the target face. The terminal performs sight/gazing detection according to target key facial feature points of the target face obtained after face alignment, to ensure that a target person is looking at a screen currently. Further, the terminal performs liveness detection and feature extraction on the target key facial feature points after the sight/gazing detection passes. Finally, the terminal obtains target facial features corresponding to the target face. The image processing device may perform face comparison according to the target facial features and the standard facial features to determine whether the target face belongs to the owner himself. If the target face belongs to the owner himself, the terminal is unlocked according to the target face. If the target face does not belong to the owner himself, skip performing of face unlocking according to the target face, and prompt that the unlocking fails.

In the following, an exemplary structure of the image processing device 455 of implementations of the disclosure which is implemented as a software module will be further described. In some implementations, as illustrated in FIG. 3, the software module of the image processing device 455 stored in the memory 450 may include an obtaining module 4551, an object detection network 4552, and an image processing module 4553. The obtaining module 4551 is configured to obtain an image to-be-processed. The object detection network 4552 is configured to perform object detection on the image to-be-processed to obtain an object detection result, where the object detection network is a network obtained by performing object detection on sample images in a sample image set based on at least one cluster center value with an initial object detection network and training iteratively the initial object detection network based on results of the object detection, and the at least one cluster center value is obtained by clustering a labeled region set corresponding to the sample image set based on clustering preset attribute information. The image processing module 4553 is configured to process the image to-be-processed based on the object detection result.

In some implementations, the image processing device 455 further includes a clustering module and a training module. The clustering module is configured to obtain the at least one cluster center value by clustering the labeled region set based on the preset attribute information, before performing object detection on the image to-be-processed with the object detection network to obtain the object detection result. In each round of training of the initial object detection network, the training module is configured to obtain a prediction region set corresponding to a present sample image of the round of training by performing object detection on the present sample image based on the at least one cluster center value with the initial object detection network, where preset attribute information corresponding to the prediction region set belongs to the at least one cluster center value. The training module is configured to update iteratively the initial object detection network based on the prediction region set and a labeled region of the present sample image until a preset training goal is reached, to obtain the object detection network.

In some implementations, the preset attribute information is size information. The clustering module configured to obtain the at least one cluster center value by clustering the labeled region set based on the preset attribute information is configured to: obtain a size information set corresponding to the sample image set by obtaining size information of a labeled region of each sample image in the sample image set; obtain at least one size information subset by clustering size information in the size information set; and for each of the at least one size information subset, calculate an average of the size information subset and assign the average as a cluster center value of the size information subset, to obtain the at least one cluster center value.

In some implementations, the training module configured to obtain the prediction region set corresponding to the present sample image of the round of training by performing object detection on the present sample image based on the at least one cluster center value is configured to: determine at least one detection range of a corresponding size according to the at least one cluster center value; and obtain the prediction region set by performing object detection on the present sample image based on the at least one detection range with the initial object detection network.

In some implementations, the image processing device 455 further includes an offline augmentation module. The offline augmentation module is configured to: obtain a raw sample image set before obtaining the at least one cluster center value by clustering the labeled region set based on the preset attribute information, where each raw sample image in the raw sample image set has a raw labeled region; for each raw sample image, obtain an augmented image corresponding to the raw sample image by performing image augmentation processing on the raw sample image, where the augmented image has an augmented labeled region, and the augmented labeled region is a region obtained after performing image augmentation processing on the raw labeled region; and determine an augmented image corresponding to each raw sample image as a sample image and determine the augmented labeled region as a labeled region of the sample image, to obtain the sample image set.

In some implementations, the image processing device 455 further includes an online augmentation module. The online augmentation module is configured to: generate randomly at least one augmentation parameter corresponding to the present sample image, before obtaining the prediction region set corresponding to the present sample image of the round of training by performing object detection on the present sample image based on the at least one cluster center value with the initial object detection network; obtain an augmented sample image corresponding to the present sample image by performing image augmentation processing on the present sample image based on the at least one augmentation parameter; and update the present sample image with the augmented sample image.

In some implementations, the at least one augmentation parameter includes a scaling factor, a pasting location, a cropping size, and a cropping location. The online augmentation module configured to obtain the augmented sample image corresponding to the present sample image by performing image augmentation processing on the present sample image based on the at least one augmentation parameter is configured to: obtain a base canvas of a corresponding size based on a size of the present sample image and the scaling factor, where the scaling factor is greater than zero and less than or equal to a scaling threshold; obtain an intermediate sample image by superimposing the present sample image at a pasting location on the base canvas; determine a cropping window according to the cropping location and the cropping size, and obtain a cropped image by cropping the intermediate sample image according to the cropping window, where the cropping window is a square window in the intermediate sample image that surrounds a labeled region of the present sample image; and determine the cropped image as the augmented sample image.

In some implementations, the at least one augmentation parameter includes a brightness adjustment parameter. The online augmentation module configured to obtain the augmented sample image corresponding to the present sample image by performing image augmentation processing on the present sample image based on the at least one augmentation parameter is configured to: obtain the augmented sample image by adjusting and augmenting a brightness of the sample image according to the brightness adjustment parameter.

In some implementations, the at least one augmentation parameter includes a brightness adjustment parameter. The online augmentation module is further configured to obtain the augmented sample image by adjusting and augmenting a brightness of the cropped image according to the brightness adjustment parameter, after obtaining the cropped image by cropping the intermediate sample image according to the cropping location and the cropping size.

In some implementations, the training module configured to obtain the object detection network by updating iteratively the initial object detection network based on the prediction region set and the labeled region of the present sample image until the preset training goal is reached is configured to: determine, for each round of training, a prediction region in the prediction region set which has an overlap degree with the labeled region greater than an overlap degree threshold as a positive sample region, to obtain a positive sample region set; calculate, for each positive sample region in the positive sample region set, at least one mapping value in at least one spatial dimension between the positive sample region and the labeled region according to a preset mapping, where the at least one mapping value is a transformation amount in the at least one spatial dimension required to map the positive sample region to the labeled region; obtain a regression loss of the initial object detection network according to the at least one mapping value and at least one preset mapping value; obtain a confidence of each positive sample region, and obtain a classification loss of the initial object detection network according to the confidence and a preset confidence; obtain a comprehensive loss of the initial object detection network based on the regression loss and the classification loss; and update iteratively a parameter of the initial object detection network based on the comprehensive loss until the preset training goal is reached, to obtain the object detection network.

It should be noted that, the foregoing device implementations are described similar to the foregoing method implementations, and so the foregoing device implementations can achieve similar advantageous effects as the method implementations. For details not disclosed in the device implementations of the disclosure, references may be made to the descriptions of the method implementations of the disclosure for understanding.

Implementations of the disclosure provide a computer program product or a computer program. The computer program product or the computer program includes computer instructions. The computer instructions are stored in a computer-readable storage medium. A processor of a computer device is configured to read the computer instructions from the computer-readable storage medium, and execute the computer instructions, to cause the computer device to execute the image processing method of implementations of the disclosure.

Implementations of the disclosure provide a non-transitory computer-readable storage medium. The non-transitory computer-readable storage medium stores executable instructions which, when executed by a processor, are operable with a processor to execute the image processing method of implementations of the disclosure, for example, the method illustrated in FIGS. 8-12 and FIG. 14.

In some implementations, the computer-readable storage medium may be a memory such as a FRAM, a ROM, a PROM, an EPROM, an EEPROM, a flash memory, a magnetic memory, an optical disk, or a CD-ROM, or may be various devices including one or any combination of the above memories.

In some implementations, the executable instructions may be in a form of programs, software, software modules, scripts, or codes, may be written in any form of programming language (including compiled or interpreted languages, or declarative or procedural languages), and may be deployed in any form, including as stand-alone programs or as modules, components, subroutines, or other units suitable for use in a computing environment.

As an example, the executable instructions may, but do not necessarily, correspond to a file in a file system, may be stored as part of a file that holds other programs or data, for example, stored in one or more scripts in a hyper text markup language (HTML) document, stored in a single file dedicated to the program in question, or stored in multiple cooperating files (e.g., files that store one or more modules, subprograms, or codes).

As an example, the executable instructions may be deployed to be executed on a computing device, multiple computing devices located at one site, or multiple computing devices distributed across multiple sites and interconnected by a communications network.

The above merely depicts some exemplary implementations of the disclosure, which however are not intended to limit the protection scope of the disclosure. Any modifications, equivalent substitutions, or improvements made thereto without departing from the spirit and scope of the disclosure shall all be encompassed within the protection scope of the disclosure.

INDUSTRIAL APPLICABILITY

In implementations of the disclosure, during training of the initial object detection network, the at least one cluster center value obtained by clustering the labeled region set corresponding to the sample image set is used to constrain an object detection result (i.e., a predicted bounding box) outputted by the initial object detection network, which can increase an overlap degree between the predicted bounding box and the labeled region. As such, the number of positive samples for training can be increased, so that the initial object detection network can learn based on more positive samples, thereby improving the accuracy of object detection based on the object detection network. In addition, the image processing device can increase the diversity of sample images by means of the online image augmentation, so that the initial object detection network can learn more about a real size and a real location of a face in a photo, which is conducive to improving a training effect of the initial object detection network, thereby improving the accuracy of object detection based on the object detection network. Furthermore, the image processing device can obtain the sample image set by performing image augmentation preprocessing on the raw sample image set, which can improve an accuracy of the labeled region of the sample image, and accordingly, an accuracy of a model trained based on the sample images can be improved, and an accuracy of object detection based on the trained object detection network can be improved.

What is claimed is:

1. An image processing method, comprising:
   obtaining an image;
   performing object detection on the image with an object detection network to obtain an object detection result; the object detection network being a network obtained by performing object detection on sample images in a sample image set based on at least one cluster center value with an initial object detection network and training iteratively the initial object detection network based on results of the object detection; the at least one cluster center value being obtained by clustering labeled regions in a labeled region set corresponding to the sample image set based on preset attribute information; and
   processing the image based on the object detection result.

2. The method of claim 1, further comprising:
   before performing object detection on the image with the object detection network to obtain the object detection result,
      obtaining the at least one cluster center value by clustering the labeled regions in the labeled region set based on the preset attribute information;
      in each round of training of the initial object detection network, obtaining a prediction region set corresponding to a present sample image of the round of training by performing object detection on the present sample image based on the at least one cluster center value with the initial object detection network, wherein preset attribute information corresponding to the prediction region set belongs to the at least one cluster center value; and
      obtaining the object detection network, by updating iteratively the initial object detection network based on the prediction region set and a labeled region of the present sample image until a preset training goal is reached.

3. The method of claim 2, wherein the preset attribute information is size information, and obtaining the at least one cluster center value by clustering the labeled regions in the labeled region set based on the preset attribute information comprises:
   obtaining a size information set corresponding to the sample image set by obtaining size information of a labeled region of each sample image in the sample image set; and
   obtaining at least one size information subset by clustering size information in the size information set, and for each of the at least one size information subset, calculating an average of the size information subset and assigning the average as a cluster center value of the size information subset, to obtain the at least one cluster center value.

4. The method of claim 3, wherein obtaining the prediction region set corresponding to the present sample image of the round of training by performing object detection on the present sample image based on the at least one cluster center value comprises:
   determining at least one detection range of a corresponding size according to the at least one cluster center value; and
   obtaining the prediction region set by performing object detection on the present sample image based on the at least one detection range with the initial object detection network.

5. The method of claim 2, further comprising:
   before obtaining the at least one cluster center value by clustering the labeled regions in the labeled region set based on the preset attribute information,
      obtaining a raw sample image set, wherein each raw sample image in the raw sample image set has a raw labeled region;
      for each raw sample image, obtaining an augmented image corresponding to the raw sample image by performing image augmentation processing on the raw sample image, wherein the augmented image has an augmented labeled region, and the augmented labeled region is a region obtained after performing image augmentation processing on the raw labeled region; and
      determining an augmented image corresponding to each raw sample image as a sample image, and determining the augmented labeled region as a labeled region of the sample image, to obtain the sample image set.

6. The method of claim 2, further comprising:
   before obtaining the prediction region set corresponding to the present sample image of the round of training by performing object detection on the present sample image based on the at least one cluster center value with the initial object detection network,
      generating randomly at least one augmentation parameter corresponding to the present sample image;
      obtaining an augmented sample image corresponding to the present sample image by performing image augmentation processing on the present sample image based on the at least one augmentation parameter; and
      updating the present sample image with the augmented sample image.

7. The method of claim 6, wherein the at least one augmentation parameter comprises a scaling factor, a pasting location, a cropping size, and a cropping location, and obtaining the augmented sample image corresponding to the present sample image by performing image augmentation processing on the present sample image based on the at least one augmentation parameter comprises:
   obtaining a base canvas of a corresponding size based on a size of the present sample image and the scaling factor, wherein the scaling factor is greater than zero and less than or equal to a scaling threshold;
   obtaining an intermediate sample image by superimposing the present sample image at a pasting location on the base canvas;
   determining a cropping window according to the cropping location and the cropping size, and obtaining a cropped image by cropping the intermediate sample image according to the cropping window, wherein the cropping window is a square window in the intermediate sample image that surrounds a labeled region of the present sample image; and
   determining the cropped image as the augmented sample image.

8. The method of claim 7, wherein the at least one augmentation parameter further comprises a brightness adjustment parameter, and the method further comprises:
   after obtaining the cropped image by cropping the intermediate sample image according to the cropping window,
      obtaining the augmented sample image by adjusting and augmenting a brightness of the cropped image according to the brightness adjustment parameter.

9. The method of claim 6, wherein the at least one augmentation parameter comprises a brightness adjustment parameter, and obtaining the augmented sample image corresponding to the present sample image by performing image augmentation processing on the present sample image based on the at least one augmentation parameter comprises:
   obtaining the augmented sample image by adjusting and augmenting a brightness of the sample image according to the brightness adjustment parameter.

10. The method of claim 2, wherein obtaining the object detection network by updating iteratively the initial object detection network based on the prediction region set and the labeled region of the present sample image until the preset training goal is reached comprises:
    for each round of training, determining a prediction region in the prediction region set which has an overlap degree with the labeled region greater than an overlap degree threshold, to obtain a positive sample region set;
    for each positive sample region in the positive sample region set, calculating at least one mapping value in at least one spatial dimension between the positive sample region and the labeled region according to a preset mapping, wherein the at least one mapping value is a transformation amount in the at least one spatial dimension required to map the positive sample region to the labeled region;
    obtaining a regression loss of the initial object detection network according to the at least one mapping value and at least one preset mapping value;
    obtaining a confidence of each positive sample region, and obtaining a classification loss of the initial object detection network according to the confidence and a preset confidence;
    obtaining a comprehensive loss of the initial object detection network based on the regression loss and the classification loss; and
    obtaining the object detection network, by updating iteratively a parameter of the initial object detection network based on the comprehensive loss until the preset training goal is reached.

11. An electronic equipment, comprising:
    a processor; and
    a memory, coupled to the processor and storing executable instructions which are operable with the processor to:
       obtain an image;
       perform object detection on the image with an object detection network to obtain an object detection result; the object detection network being a network obtained by performing object detection on sample images in a sample image set based on at least one cluster center value with an initial object detection network and training iteratively the initial object detection network based on results of the object detection; the at least one cluster center value being obtained by clustering labeled regions in a labeled region set corresponding to the sample image set based on preset attribute information; and process the image based on the object detection result.

12. The electronic equipment of claim 11, wherein the processor is further configured to:

before performing object detection on the image with the object detection network to obtain the object detection result, obtain the at least one cluster center value by clustering the labeled regions in the labeled region set based on the preset attribute information;

in each round of training of the initial object detection network, obtain a prediction region set corresponding to a present sample image of the round of training by performing object detection on the present sample image based on the at least one cluster center value with the initial object detection network, wherein preset attribute information corresponding to the prediction region set belongs to the at least one cluster center value; and obtain the object detection network, by updating iteratively the initial object detection network based on the prediction region set and a labeled region of the present sample image until a preset training goal is reached.

13. The electronic equipment of claim 12, wherein the preset attribute information is size information, and the processor configured to obtain the at least one cluster center value by clustering the labeled regions in the labeled region set based on the preset attribute information is configured to:

obtain a size information set corresponding to the sample image set by obtaining size information of a labeled region of each sample image in the sample image set; and obtain at least one size information subset by clustering size information in the size information set, and for each of the at least one size information subset, calculate an average of the size information subset and assign the average as a cluster center value of the size information subset, to obtain the at least one cluster center value.

14. The electronic equipment of claim 13, wherein the processor configured to obtain the prediction region set corresponding to the present sample image of the round of training by performing object detection on the present sample image based on the at least one cluster center value is configured to:

determine at least one detection range of a corresponding size according to the at least one cluster center value; and obtain the prediction region set by performing object detection on the present sample image based on the at least one detection range with the initial object detection network.

15. The electronic equipment of claim 12, wherein the processor is further configured to:

before obtaining the at least one cluster center value by clustering the labeled regions in the labeled region set based on the preset attribute information, obtain a raw sample image set, wherein each raw sample image in the raw sample image set has a raw labeled region;

for each raw sample image, obtain an augmented image corresponding to the raw sample image by performing image augmentation processing on the raw sample image, wherein the augmented image has an augmented labeled region, and the augmented labeled region is a region obtained after performing image augmentation processing on the raw labeled region; and determine an augmented image corresponding to each raw sample image as a sample image, and determine the augmented labeled region as a labeled region of the sample image, to obtain the sample image set.

16. The electronic equipment of claim 12, wherein the processor is further configured to:

before obtaining the prediction region set corresponding to the present sample image of the round of training by performing object detection on the present sample image based on the at least one cluster center value with the initial object detection network, generate randomly at least one augmentation parameter corresponding to the present sample image;

obtain an augmented sample image corresponding to the present sample image by performing image augmentation processing on the present sample image based on the at least one augmentation parameter; and update the present sample image with the augmented sample image.

17. The electronic equipment of claim 16, wherein the at least one augmentation parameter comprises a scaling factor, a pasting location, a cropping size, and a cropping location, and the processor configured to obtain the augmented sample image corresponding to the present sample image by performing image augmentation processing on the present sample image based on the at least one augmentation parameter is configured to:

obtain a base canvas of a corresponding size based on a size of the present sample image and the scaling factor, wherein the scaling factor is greater than zero and less than or equal to a scaling threshold;

obtain an intermediate sample image by superimposing the present sample image at a pasting location on the base canvas;

determine a cropping window according to the cropping location and the cropping size, and obtain a cropped image by cropping the intermediate sample image according to the cropping window, wherein the cropping window is a square window in the intermediate sample image that surrounds a labeled region of the present sample image; and determine the cropped image as the augmented sample image.

18. The electronic equipment of claim 16, wherein the at least one augmentation parameter comprises a brightness adjustment parameter, and the processor configured to obtain the augmented sample image corresponding to the present sample image by performing image augmentation processing on the present sample image based on the at least one augmentation parameter is configured to:

obtain the augmented sample image by adjusting and augmenting a brightness of the sample image according to the brightness adjustment parameter.

19. The electronic equipment of claim 12, wherein the processor configured to obtain the object detection network by updating iteratively the initial object detection network based on the prediction region set and the labeled region of the present sample image until the preset training goal is reached is configured to:
- for each round of training, determine a prediction region in the prediction region set which has an overlap degree with the labeled region greater than an overlap degree threshold, to obtain a positive sample region set;
- for each positive sample region in the positive sample region set, calculate at least one mapping value in at least one spatial dimension between the positive sample region and the labeled region according to a preset mapping, wherein the at least one mapping value is a transformation amount in the at least one spatial dimension required to map the positive sample region to the labeled region;
- obtain a regression loss of the initial object detection network according to the at least one mapping value and at least one preset mapping value;
- obtain a confidence of each positive sample region, and obtain a classification loss of the initial object detection network according to the confidence and a preset confidence;
- obtain a comprehensive loss of the initial object detection network based on the regression loss and the classification loss; and
- obtain the object detection network, by updating iteratively a parameter of the initial object detection network based on the comprehensive loss until the preset training goal is reached.

20. A non-transitory computer-readable storage medium storing executable instructions which, when executed by a processor, cause the processor to carry out actions, comprising:
- obtaining an image;
- performing object detection on the image with an object detection network to obtain an object detection result; the object detection network being a network obtained by performing object detection on sample images in a sample image set based on at least one cluster center value with an initial object detection network and training iteratively the initial object detection network based on results of the object detection; the at least one cluster center value being obtained by clustering labeled regions in a labeled region set corresponding to the sample image set based on preset attribute information; and
- processing the image based on the object detection result.

* * * * *